(12) United States Patent
Burns, Sr.

(10) Patent No.: US 7,886,628 B2
(45) Date of Patent: Feb. 15, 2011

(54) SHIFT LEVER VIBRATION ISOLATION ASSEMBLY

(76) Inventor: James M. Burns, Sr., 216 Lakecrest Blvd., Hinckley, OH (US) 44233

( * ) Notice: Subject to any disclaimer, the term of this patent is extended or adjusted under 35 U.S.C. 154(b) by 493 days.

(21) Appl. No.: 12/006,913

(22) Filed: Jan. 7, 2008

(65) Prior Publication Data
US 2008/0163715 A1 Jul. 10, 2008

Related U.S. Application Data

(60) Provisional application No. 60/879,258, filed on Jan. 8, 2007.

(51) Int. Cl.
*B60K 20/02* (2006.01)

(52) U.S. Cl. .......................... 74/473.29; 74/544; 74/548

(58) Field of Classification Search ................ 74/473.1, 74/473.29, 544, 548, 523, 543, 473.27, 473.34; 267/140.5, 141.2, 141.3–141.5; 403/49; 464/89; 248/580, 608, 599
See application file for complete search history.

(56) References Cited

U.S. PATENT DOCUMENTS

| | | | | |
|---|---|---|---|---|
| 3,767,167 A * | 10/1973 | Rasmussen | ................ | 256/26 |
| 4,492,129 A * | 1/1985 | Hasegawa | ................ | 74/473.29 |
| 4,603,997 A * | 8/1986 | Hundt et al. | ................ | 403/228 |
| 4,962,915 A * | 10/1990 | Thorn | .................... | 267/140.13 |
| 4,968,055 A * | 11/1990 | Reilly | ...................... | 280/86.75 |
| 5,288,059 A * | 2/1994 | Gautheron et al. | .......... | 267/292 |
| 5,452,623 A * | 9/1995 | Knight | ..................... | 74/473.29 |
| 6,360,627 B1 | 3/2002 | Buckingham et al. | | |
| 7,296,493 B2 | 11/2007 | Buckingham et al. | | |
| 2004/0194568 A1* | 10/2004 | Ply et al. | ................. | 74/473.29 |
| 2006/0021459 A1* | 2/2006 | Buckingham et al. | .... | 74/473.29 |

* cited by examiner

*Primary Examiner*—Richard W Ridley
*Assistant Examiner*—Terence Boes
(74) *Attorney, Agent, or Firm*—Roetzel & Andress

(57) ABSTRACT

A shift lever assembly designed to isolate vibrations including an outer can having a bore and an outer wall, an inner can disposed within the bore, a vibration absorbing material positioned within the bore and around the inner can; and a sleeve extending from the outer wall of the outer can. The method of making the shift lever assembly includes positioning an outer can having a bore and an attached sleeve in a mold, positioning an inner can in the mold, within the bore of the outer can, injecting a vibration absorbing material into the mold, thereby filling the space within the bore of the outer can around the inner can, and allowing the vibration absorbing material to cure, thereby securing the inner can within the outer can.

8 Claims, 2 Drawing Sheets

SHIFT LEVER VIBRATION ISOLATION ASSEMBLY

This application claims priority of U.S. provisional Application No. 60/879,258 filed Jan. 8, 2007, which is incorporated herein by reference.

TECHNICAL FIELD

In general, the present invention relates to a shift lever vibration isolation assembly. In particular, the present invention relates to a shift lever vibration isolation assembly having an outer can that houses an inner can surrounded by vibration-absorbing material, and a sleeve attached to the outer can for receiving a shift lever. The present invention also relates to a method of manufacturing the shift lever vibration isolation assembly.

BACKGROUND ART

Shift lever assemblies which absorb or isolate vibrations are known to persons skilled in the art. Such assemblies can be used in many applications to isolate or absorb vibration sources. Typical of such applications would be the transmission shift lever in a vehicle. Existing shift lever vibration isolation assemblies, as depicted in FIG. 1, typically include an outer can A having an inner can B received therein, with vibration-absorbing material C located between the inner and outer can. The outer can has a shift lever D emanating from the outside wall of the outer can, with the shift lever being welded to the outside wall of the outer can. The shift lever is welded to the can before the vibration-absorbing material is provided within the can because heat transfer from the welding process would destroy the bond between the vibration-absorbing material and the can. The heat transfer from the welding process would also destroy the vibration-absorbing material, which is typically an elastomer, as it is immediately adjacent to the welding heat without a heat sink.

Alternative production methods which might otherwise produce a better product have thus far proven impractical due to time and costs constraints. Particularly, due to the large size of the shift lever, it is not practical to use an molding process to form the vibration absorbing material within the outer can after the shift lever has been welded to the outer can. The size of the shift lever severely limits the number of assemblies that can be molded at one time, making the process extremely inefficient and cost prohibitive. As a result of the welding required to attach the shift lever to the outer can and the necessity to do so prior to insertion of the rubber insert which absorbs vibrations, conventional shift lever assemblies have used rubber cement to attach the rubber insert. The rubber cement does not provide an ideal bond between the rubber insert and the outer and inner cans. The present invention improves upon this by allowing rubber to be injected directly into an outer can supported in a mold, as will be described more completely below.

DISCLOSURE OF THE INVENTION

It is thus an object of the present invention to provide a shift lever vibration isolation assembly adapted to allow a shift lever to be secured thereto with or without welding.

It is a further object of the present invention to provide a shift lever vibration isolation assembly having an improved bond between the outer and inner can and the elastomer.

It is an additional object of the present invention to provide a shift lever vibration isolation assembly having an outer can with a sleeve extending therefrom.

It is another object of the present invention to provide a more efficient and cost effective method of manufacturing a shift lever vibration isolation assembly.

These and other objects of the present invention, as well as the advantages thereof over existing prior art forms, which will become apparent from the description to follow, are accomplished by the improvements hereinafter described and claimed.

A preferred exemplary shift lever vibration isolation assembly includes an outer can having a bore, an inner can disposed within the bore, a vibration absorbing material positioned within the bore and around the inner can, and a sleeve attached to the outer wall of the outer can.

A preferred exemplary method of producing the shift lever vibration isolation assembly of the present invention includes positioning an outer can having a bore and a sleeve in a mold, positioning an inner can in the mold, within the bore of the outer can and spaced from the outer can, injecting a vibration absorbing material into the mold, thereby filling the space within the bore of the outer can around the inner can, and allowing the vibration absorbing material to cure, thereby securing the inner can within the outer can.

PREFERRED EMBODIMENT FOR CARRYING OUT THE INVENTION

Figure 2:
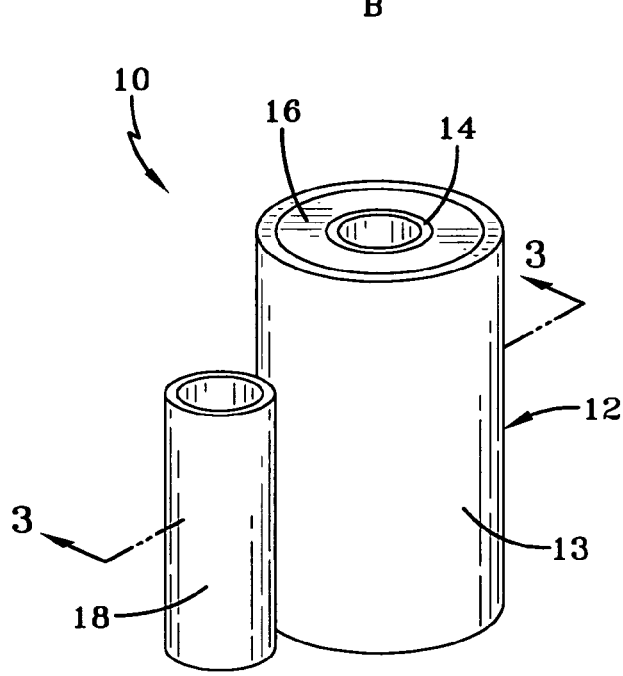
FIG. 2 is an perspective view of the shift lever vibration isolation assembly according to the concepts of the present invention.
Figure 3:
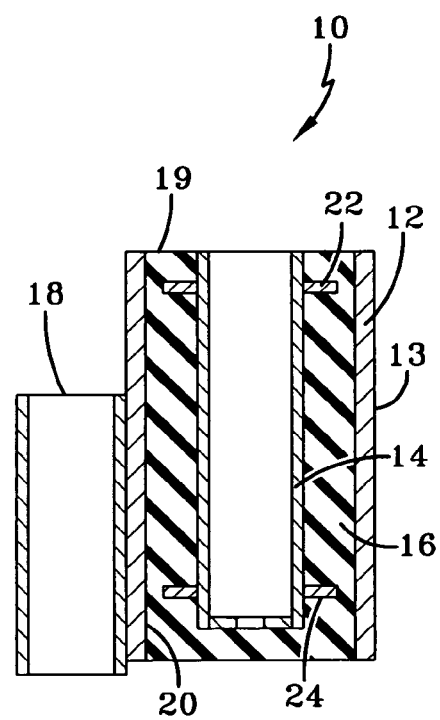
FIG. 3 is a sectional view of the shift lever assembly taken substantially along line 3-3 of FIG. 2.

In general, the present invention includes a vibration isolation assembly indicated by the number 10 in the accompanying drawings. The vibration isolation assembly 10 is generally used to attenuate or absorb vibrations from a source object before the vibrations reach a user. The vibration isolation assembly described herein may be used in a number of applications. For the sake of simplicity, the following description relates to a shift lever vibration isolation assembly. This assembly is shown and described as one example of the present invention and should not be considered limiting. With reference to FIGS. 2 and 3, vibration isolation assembly 10 generally includes an outer can 12 having an outer wall 13, an inner can 14 housed within the outer can 12, and vibration-absorbing or isolating material 16 located between the outer and inner cans 12, 14. In accordance with the concepts of the present invention, a sleeve 18 is attached to the outer can 12 to which a shift lever or other object (not shown) may be attached.

It will be appreciated that outer can 12 may have any shape that suitably receives inner can 14 and vibration-absorbing material 16. The outer can 12 includes a bore 19 in all embodiments, regardless of its shape, to allow inner can 14 and vibration-absorbing material 16 to be disposed therein. Bore 19 is defined by the inner wall 20 of outer can 12. The outer can 12 may be taller, shorter, or otherwise dimensioned according to the particular application where it will be used. The same holds true for inner can 14 and sleeve 18. These may have any shape or dimension depending upon a particular application. In general, outer can 12 acts as an adapter for attaching an object, such as a shift lever for example, to another object, such as a transmission, where vibration is emanating or terminating. The shapes of the outer can 12, the inner can 14, and the sleeve 18 are not to be considered limiting.

Also, while the sleeve 18 is shown as attached to outer wall 13 of outer can 12, it will be appreciated that these components may be formed as one piece, for example, as by casting or extrusion. For sake of simplicity, the term "attached" will be used in its traditional sense and also to include the formation of separate parts as a single piece. In addition, sleeve 18 may be of any shape or construction so long as a shift lever or other object may be attached thereto. For instance, sleeve 18 may also be of a piece of bar stock, or a half cylinder, to which an object may be attached.

Figure 1:
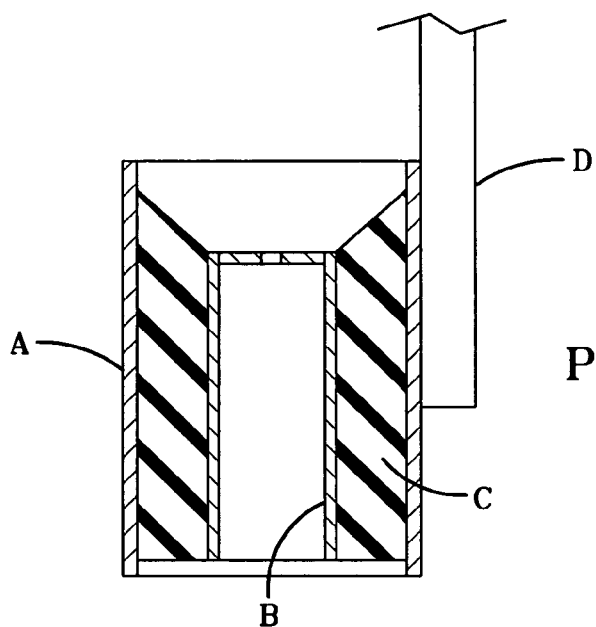
FIG. 1 is a sectional view of a prior art design of a shift lever vibration isolation assembly.

By using sleeve 18, objects of any shape or size may be later affixed to vibration-isolation assembly 10 in any method known in the art including, for example, press fitting, weldment, swaging, or through the use of adhesives or traditional fasteners. Beneficially, the shift lever or other object may be attached to sleeve 18 after vibration-absorbing material 16 is provided into outer can 12. By adding the sleeve 18, when attaching the shift lever, in contrast to the prior-art method of directly attaching the shift lever to outer can 12, it is possible to heat sink the outer can 12 protecting elastomeric vibration-absorbing material 16 and the bond formed between the material 16 and the outer can 12. In some cases, this may eliminate the need for the use of adhesives to join vibration-absorbing material 16 to outer can 12. As shown, sleeve 18 is made smaller than the object being attached to outer can 12 to increase the number of assemblies 10 that can be processed in a single mold. Sleeve 18 may, however, be of any suitable size and shape for mounting an object to the assembly. FIG. 1 shows a prior-art can and shift lever combination for purposes of comparison. In the example shown in FIGS. 2 and 3, sleeve 18 is shorter than outer can 12.

As best shown in FIG. 3, inner can 14 may be made hollow to act as a receiver for attaching the vibration-isolation assembly 10 to a second object, such as a transmission in a vehicle. In this application, inner can 14 may be provided with stops 22, 24 that extend outwardly from inner can 14 in a radial direction. The stops 22, 24 create areas where a relatively small amount of absorbing material 16 separates the outer can 12 from inner can 14. This results in improved feedback to the operator and a system that is more responsive to the inputs from the operator by creating near metal-to-metal contact between inner wall 20 of outer can 12 and inner can 14 when the shift lever is moved. It will be appreciated that the stops 22, 24 may have virtually any shape and may be patterned to facilitate manufacturing or improve function. For example, stops 22, 24 may be provided with scalloped inside or outside diameters or with through holes to assist the flow of elastomer and allow the escape of trapped gases during molding of the absorbing material 16 around inner can 14. Stops 22, 24 may also be shaped to have projecting portions that may be oriented so that stops 22, 24 reduce the amount of material between the outer can and the inner can in selected directions. The shapes of the stops 22, 24 should not be considered as limiting the scope of the present invention. It will be appreciated that stops 22, 24 may alternatively be attached to the inner wall 20 of outer can 12 and operate in the same fashion.

Stops 22, 24 as shown in FIG. 3 may be attached in any manner to either inner can 14 or outer can 12, including by being seamlessly bonded, by welding, by press fitting, or by one-piece formation. The means of attaching stops 22, 24 to inner can 14 or outer can 12 should not be viewed as limiting the scope of the present invention. Advantageously, the attachment of stops 22, 24 allows them to be placed inwardly of the extreme outer ends of outer can 12. Existing designs suggest placing positive stops at the extreme outer ends of the can without any attachment. In these designs, in addition to the undesirable formation of elastomeric flash, the elastomeric material often seeps between the inner can 14 and stops 22, 24, requiring additional machining to clear this material.

Figure 4:
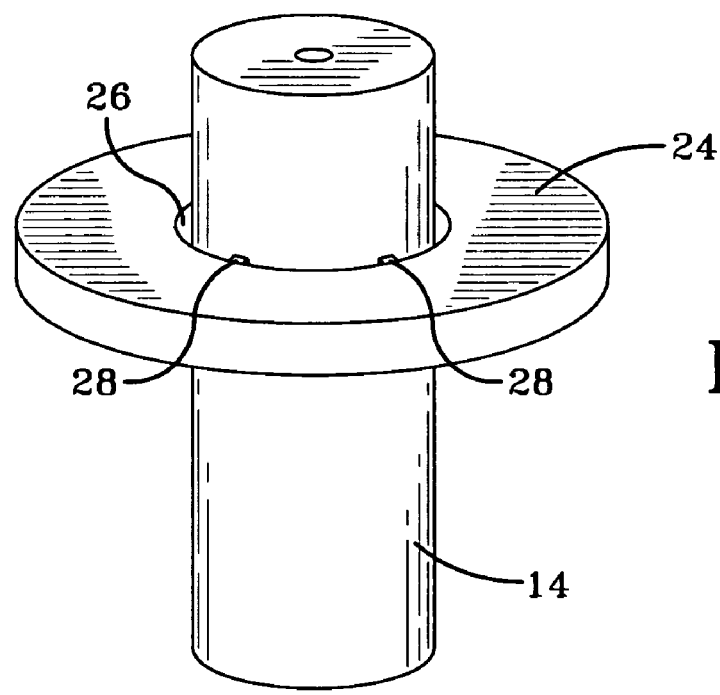
FIG. 4 is an perspective view of an inner can having a positive stop according to the concepts of the present invention.

FIG. 4 depicts an alternate embodiment of the attachment of stop 24 to inner can 14 in which stop 24 is tack welded to inner can 14. Stop 24 has an inner diameter that is slightly larger than the outer diameter of inner can 14, thereby creating a gap 26 therebetween. Tack welds 28 acts to hold stop 24 in place during the molding process, while allowing the elastomer, as well as air and gas, to flow through the gap 26 between inner can 14 and stop 24.

Figure 5:
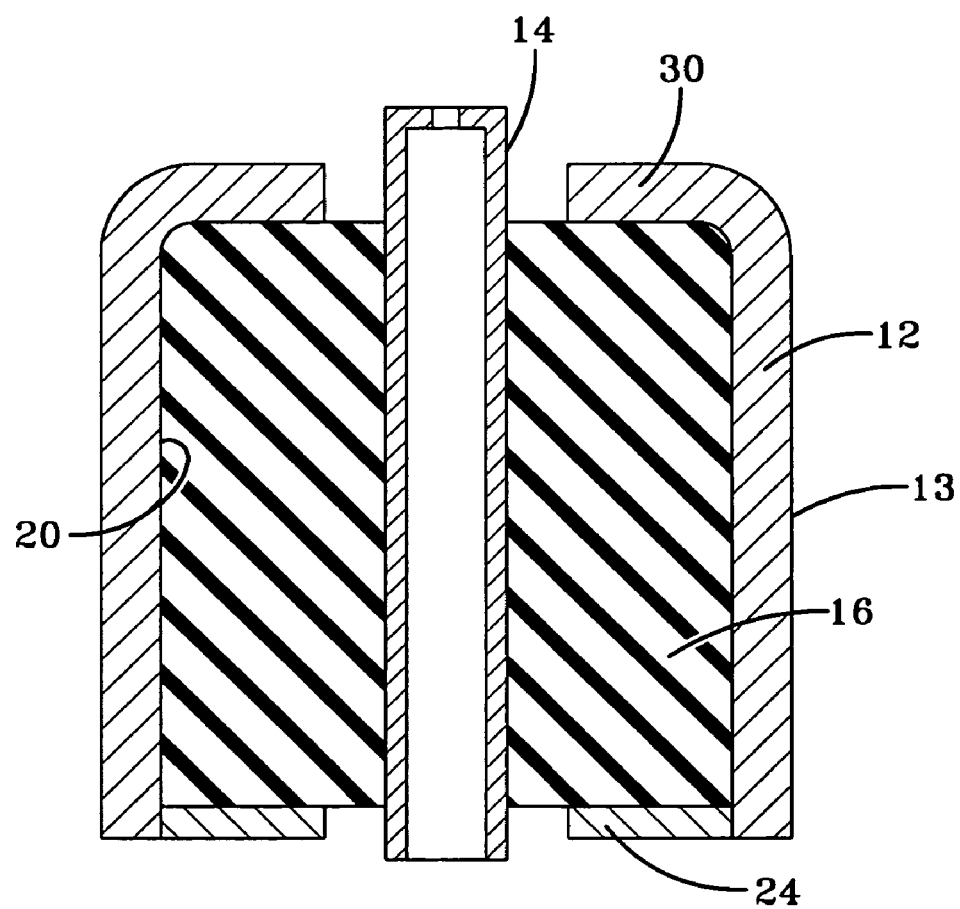
FIG. 5 is a sectional view, similar to FIG. 3, of a second embodiment of the shift lever assembly of the present invention in which the outer can includes a top edge that is rolled over.

To form the vibration-absorbing material 16 between the inner can 14 and outer can 12, the outer can 12 with sleeve 18 attached may be provided in a mold with the inner can 14 supported within the bore of outer can 12 and spaced from the inner wall 20 of outer can 12. As will be appreciated, due to the shorter height of the outer can 12 and sleeve 18 combination relative to existing can and shift lever combinations, a large number of outer can 12 and inner can 14 assemblies may be located in a single mold. With the outer can 12 and inner can 14 arranged in a mold, elastomeric material or other suitable vibration-absorbing material is injected into the mold to fill the voids between outer can 12 and inner can 14. The elastomer 16 may be chemically attached to outer can 12 and inner can 14 or secured by mechanical entrapment. For example, the end 30 of outer can 12 may be rolled over as depicted in FIG. 5 to entrap vibration-absorbing material 16. Advantageously, this eliminates the additional step of applying adhesives or chemically bonding the elastomeric material to outer can 12.

What is claimed is:

1. A shift lever assembly comprising an outer can having a bore; an inner can disposed within said bore of said outer can; a vibration absorbing material positioned entirely within said bore of said outer can and around said inner can; and a sleeve attached to an outer wall of said outer can and spaced from said inner can and said vibration absorbing material; said inner can including at least one stop extending outwardly therefrom; a gap between said outer can and said stop, and said stop being attached to said inner can by at least one tack weld.

2. The shift lever assembly of claim 1, said vibration absorbing material being an elastomer.

3. The shift lever assembly of claim 1, said sleeve being welded to said outer can.

4. The shift lever assembly of claim 1, said stop extending outwardly such that it does not contact said outer can.

5. The shift lever assembly of claim 1, said outer can having two ends, and at least one of said ends being curved inward to secure said vibration absorbing material therein.

6. The shift lever assembly of claim 1, said outer can and said inner can being cylindrical in shape with said inner can being positioned coaxially within said outer can.

7. The shift lever assembly of claim 1, said vibration absorbing material being chemically bonded to said outer can and said inner can and not in contact with the sleeve.

8. The shift lever assembly of claim 1, said sleeve having a bore therein adapted to receive a shift lever.

* * * * *